Figure 1:
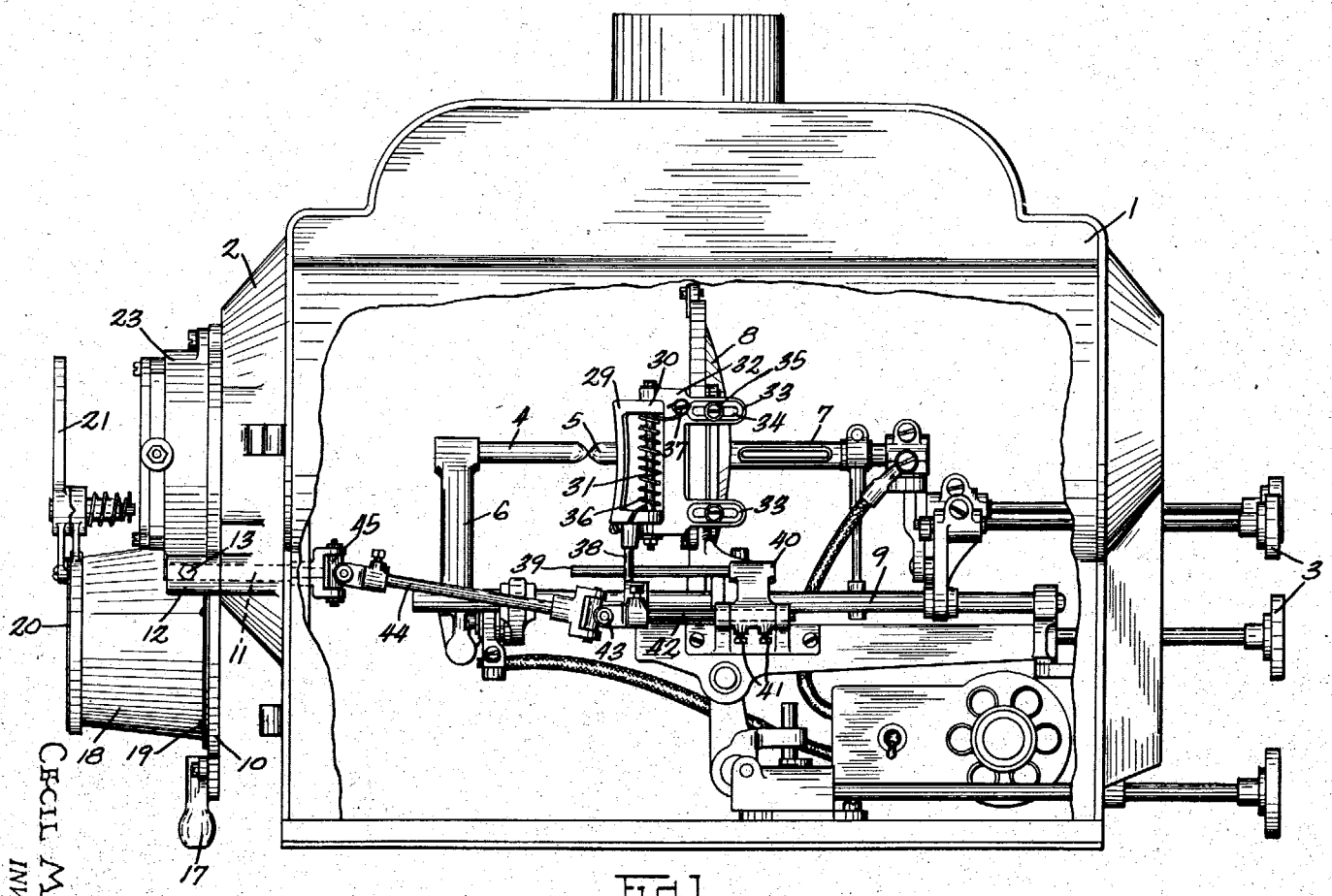

July 2, 1929. C. M. FOX Re. 17,350

PROJECTION APPARATUS FOR STEREOPTICON VIEWS AND CINEMATOGRAPHIC FILMS

Original Filed May 17, 1926 2 Sheets-Sheet 1

CECIL M. FOX
INVENTOR.

BY Smith and Freeman
ATTORNEYS.

July 2, 1929. C. M. FOX Re. 17,350
PROJECTION APPARATUS FOR STEREOPTICON VIEWS AND CINEMATOGRAPHIC FILMS
Original Filed May 17, 1926 2 Sheets-Sheet 2
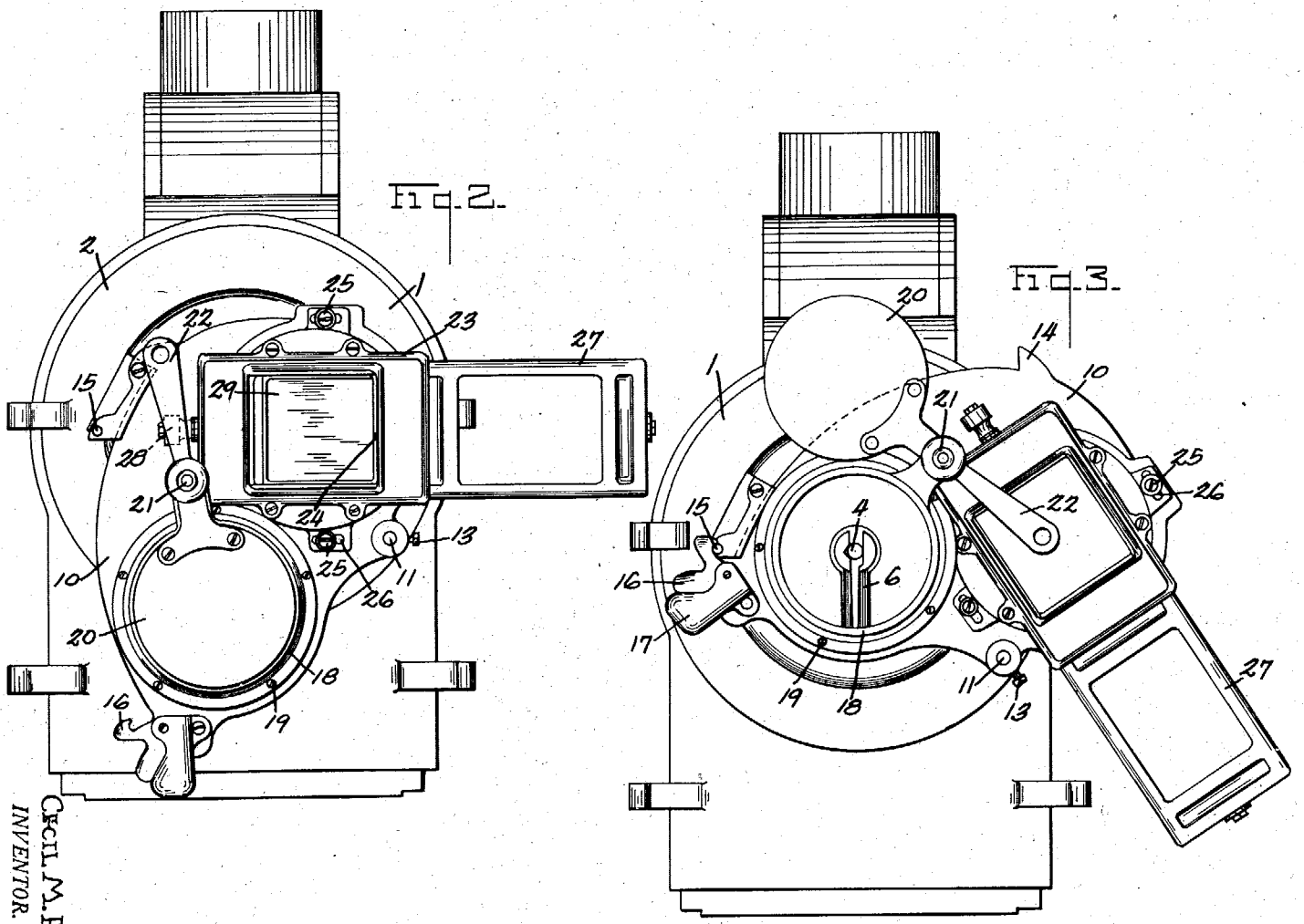
CECIL M. FOX
INVENTOR.
BY Smith and Freeman
ATTORNEYS.

Reissued July 2, 1929. Re. 17,350

UNITED STATES PATENT OFFICE.

CECIL M. FOX, OF TOLEDO, OHIO, ASSIGNOR, BY MESNE ASSIGNMENTS, TO THE STRONG ELECTRIC COMPANY, OF TOLEDO, OHIO, A CORPORATION OF OHIO.

PROJECTION APPARATUS FOR STEREOPTICON VIEWS AND CINEMATOGRAPHIC FILMS.

Original No. 1,620,956, dated March 15, 1927, Serial No. 109,467, filed May 17, 1926. Application for reissue filed March 14, 1929. Serial No. 347,147.

This invention relates to projection apparatus, and more particularly to apparatus of the type which is adapted to project either cinematographic films or stereopticon views, and the principal object of my invention is to provide new and improved apparatus of this type. In the drawings accompanying this specification and forming a part of this application I have shown, for purposes of illustration, one form which my invention may assume, and in these drawings:

Figure 1 is a side elevation of a projection apparatus embodying the invention with one side wall thereof broken away, Figure 2 is a front end elevation showing the muzzle in position for displaying stereopticon views; and Figure 3 is a view similar to Figure 2 showing the muzzle arranged for displaying cinematographic films.

The illustrated embodiment of the invention comprises a housing 1 formed of sheet metal and of general rectangular form. The front end portion 2 of the housing 1 is substantially frusto-conical in shape, and extending rearwardly from the housing 1 are a plurality of adjusting knobs 3 for adjusting the positions of the mechanism contained within the housing for providing an efficient projected light.

The function of the various adjusting knobs 3 will not be described inasmuch as these form no part of the present invention.

The source of light generated within the housing 1 consists of an arc lamp having opposed electrodes 4 and 5, the electrode 4 being carried by an upright support 6, and the electrodes 5 being carried by a support 7. The supports 6 and 7 may be adjusted relatively to each other in any well known manner so as to effect a light of the required brilliancy. The arc lamp also includes a reflector 8 which is horizontally slidable on parallel rods 9 (only one rod being shown).

In accordance with this invention a muzzle 10 fits over the front end portion 2 of the housing 1. The muzzle 10 may be of relatively thin metal and formed by stamping. To connect the muzzle 10 to the housing 1 a horizontal shaft 11 is rotatably mounted in the housing 1 and extends into a boss 12 integral with the muzzle 10, a set screw 13 in the boss 12 connecting the muzzle 10 and shaft 11 to rotate together. It will thus be seen that the muzzle 10 may be swung in a vertical plane over the opening of the outer end portion 2 of the casing 1.

To limit the downward movement of the muzzle 10 a lug 14 is formed thereon for engagement with an outwardly projecting pin 15 on the end portion 2. For limiting the upward swinging movement of the muzzle 10 and for holding the same in this position, a catch 16 is adapted to engage the pin 15 as indicated in Figure 3. A handle 17 may be fixed to the muzzle for enabling the same to be readily moved.

The muzzle 10 is provided in one portion thereof with an opening over which fits an outwardly extending tubular member 18 secured to the muzzle by screws 19. When the muzzle is swung to its upper position, as shown, in Figure 3, the center of the tubular member 18 is substantially in line with the electrodes 4 and 5, and in this position the apparatus may be used for displaying cinematographic films. In devices of this character it is desirable to provide a shutter so that the source of light may be cut off when desired, and for this purpose a shutter 20 is pivoted at 21 and is provided with an operating handle 22.

When the muzzle 10 is swung downwardly with the stop 14 in engagement with the pin 15, means are provided for displaying stereopticon views. For this purpose an opening is provided in the muzzle 10 adjacent to the tubular member 18. Attached to the outer side of the muzzle 10 is an outwardly extending member 23 having a rectangular opening 24 thru which stereopticon views may be displayed. The opening 24 is disposed at one side of the electrodes 4 and 5, and the light from the arc lamp is projected thru the opening 24 in an indirect manner hereinafter described. The member 23 is attached to the muzzle 10 by screws 25 disposed in elongated slots 26 so that a slight lateral adjustment of the member 23 may be made relatively to the muzzle 10. Movable across the member 23 is a slide 27 having a knob 28 at one end so that the slide may be moved to and fro across the opening 24 to display the views carried by the slide.

A reflector 29 is mounted at one side of the electrodes 4 and 5, and when in operative position is adapted to direct the light from the arc lamp thru the opening 24 in the member 23 so that stereopticon views may be displayed.

The reflector 29 is provided at one side thereof with rearwardly extending lugs 30 which are rotatively mounted on a vertically disposed rod 31 carried by a bracket 32. The bracket 32 is formed with rearwardly extending arms 33 which have elongated slots 34, and screws 35 extending thru the slots 34 connect the bracket 32 to the main reflector frame 8.

A helical spring 36 is wound around the shaft 31 and has one end bearing against the reflector 29 and the other end secured to a screw 37 on the bracket 32. This spring serves normally to hold the reflector 29 in operative position so that the light from the arc lamp may be directed thru the opening 24 in the member 23.

Depending from the reflector 29 is a pin 38 which is engaged at its inner side by a horizontal rod 39 carried by a bracket 40 secured by set screws 41 to a shaft 42, and the opposite end of the shaft 42 is connected to a universal joint 43, and the universal joint 43 is connected to the shaft 11 by means of a rod 44 and a universal joint 45.

From the above description it will be seen that when the handle 17 of the muzzle 10 is swung downwardly to the position shown in Figure 2, so that stereopticon views may be displayed thru the rectangular opening 24, the reflector 29 is disposed in operative position relatively to the arc lamp. When it is desired to discontinue the displaying of stereopticon views the handle 17 of the muzzle 10 may be swung upwardly until the catch 16 engages the pin 15, and in this position the tubular projection 18 is properly positioned relatively to the arc lamp so that the light generated is satisfactory for displaying cinematographic films. It will be observed that when the muzzle is swung upwardly the shaft 11 is rotated in a clockwise direction, (Figures 2 and 3) and this movement is transmitted thru the universal joints 45 and 43, rod 44, shaft 42, and rod 39, to the depending pin 38 of the reflector 29. By this movement the pin 38 is engaged and the reflector 29 is swung away from the arc lamp to inoperative position. When the handle 17 of the muzzle is again swung downwardly the rod 39, through the connections described, is moved away from the pin 38, and the coil spring 31 therafter functions to move the reflector 29 to operative position so that the stereopticon views may be displayed.

It will be seen that the reflector 29 is automatically moved into and out of position, and this movement in one direction is actuated by means of the muzzle 10, and in the opposite direction is controlled by movement of the muzzle 10. The above described construction has proved especially satisfactory and efficient for the purpose.

While I have described my improved machine in more or less detail to comply with the requirements of the statute, it is nevertheless desired that this detailed description be considered merely as illustrative, and not as limiting, as it is to be understood that changes and modifications may be made by those skilled in this art without departing from the spirt of the invention, or sacrificing the advantages thereof.

I claim:

1. In a projection apparatus having a housing and a source of light within said housing, a muzzle on said housing provided with a pair of openings, means for moving said muzzle in one direction or another, a supplemental reflector adjacent said source of light, a connection between said muzzle and reflector for actuating said reflector away from said source of light, and means for moving said reflector adjacent the source of light when said muzzle is moved to a predetermined position thereby to direct light rays through one of said openings.

2. In a projection apparatus having a housing and a source of light within said housing a muzzle connected to said housing and provided with a pair of openings, means for pivotally connecting said muzzle to said housing, means associated with said source of light for directing light rays through one of said openings, and means operable by movement of said muzzle for moving said light directing means away from said source of light.

3. In a projection apparatus having a housing, a muzzle connected to one end of said housing, an outwardly extending tubular projection on said muzzle through which cinematographic films may be displayed when the muzzle is in one position, a substantially rectangular projection on said muzzle adjacent said tubular projection through which stereoptic views may be displayed when said muzzle is moved to another position, a source of light within said housing, one projection being registrable with said source of light when the muzzle is in one position, and means actuated by movement of said muzzle for directing light through the other projection when the muzzle is moved to another position.

4. In a projection apparatus having a housing and a source of light within said housing, a muzzle on the outer end of said housing provided with a pair of openings, means to move said muzzle to bring one or the other of said openings into the region of said source of light, a pivotally mounted reflector adjacent said source of light, and means connecting said muzzle and reflector whereby when said muzzle is moved to one position said reflector is operatively positioned to reflect rays from said source through one opening and when said muzzle is moved to the opposite position the reflector is moved away from the source to inoperative position.

5. In a projection apparatus having a housing and a source of light within said housing, a muzzle connected to one end of said housing and provided with a pair of openings, a reflector adjacent said source of light for directing light rays through one of said openings, spring means for normally holding said reflector in operative position, and a connection between said muzzle and said reflector for moving said reflector away from the source of light when said muzzle is moved to a predetermined position.

6. In a projection apparatus having a housing and a source of light within said housing, a muzzle connected to the outer end of said housing, means for moving said muzzle to different positions, a reflector adjacent said source of light for directing light rays through one of said openings, means for moving said reflector to operative position, and means actuated by movement of said muzzle for moving said reflector to inoperative position.

7. In a projection apparatus having a housing and source of light within the housing, a muzzle on one end of said housing having a pair of openings, a shaft rotatably mounted in said housing, and to which said muzzle is fixed, a pivotally mounted vertically disposed reflector adjacent said source of light, means for actuating said reflector to operative position to direct light rays from said source of light through one of said openings, and means connecting said shaft and reflector for swinging said reflector to inoperative position when the muzzle is moved to a predetermined position.

8. In a projection apparatus having a housing and a source of light within the housing, a muzzle pivoted to one end of said housing having openings for displaying stereopticon views and cinematographic films at different periods, a reflector adjacent said source of light for directing light rays through one of said openings to display stereopticon views, means actuated by movement of said muzzle for moving the reflector to one position, and means for moving the reflector to another position.

9. In a projection apparatus having a housing and a source of light within said housing, a muzzle for one end of said housing and provided with a pair of openings through which light rays may be projected, a shaft rotatably mounted in said housing and to which said muzzle is pivotally connected, a reflector adjacent said source of light, means for pivotally mounting said reflector, means including universal joints connecting said shaft and reflector whereby movement of said muzzle in one direction moves said reflector away from said source of light, and means for moving said reflector to operative position when said muzzle is swung in the opposite direction.

10. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

11. Projection apparatus comprising: a housing; movable light-beam-producing mechanism disposed within said housing movable to vary the focus of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

12. Projection apparatus comprising: a housing; movable light-beam-producing mechanism disposed within said housing, comprising light-producing means, comprising also movable reflector means cooperating with said light-producing means to produce a light beam, and variable by movement of said reflector means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

13. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms automatically effects such movement of the other of said mechanisms.

14. Projection apparatus comprising: a housing; movable light-beam-producing mechanisms disposed within said housing movable to vary the focus of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms automatically effects such movement of the other of said mechanisms.

15. Projection apparatus comprising: a housing; movable light-beam-producing mechanism disposed within said housing, comprising light-producing means, comprising also movable reflector means cooperating with said light-producing means to produce a light beam, and variable by movement of said reflector means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beams; and means whereby such movement of one of said mechanisms automatically effects such movement of the other of said mechanisms.

16. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism automatically effects such movement of said light-beam-producing mechanism.

17. Projection apparatus comprising: a housing; movable light-beam-producing mechanism disposed within said housing movable to vary the focus of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism automatically effects such movement of said light-beam-producing mechanism.

18. Projection apparatus comprising: a housing; movable light-beam-producing mechanism disposed within said housing, comprising light-producing means, comprising also movable reflector means cooperating with said light-producing means to produce a light beam, and variable by movement of said reflector means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism automatically effects such movement of said reflector means.

19. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms in each direction will automatically be accompanied by such movement of the other of said mechanisms in the corresponding direction.

20. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms in each direction automatically effects such movement of the other of said mechanisms in the corresponding direction.

21. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism in each direction automatically effects such movement of said light-beam-producing mechanism in the corresponding direction.

22. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms in each direction will automatically be accompanied by such movement of the other of said mechanisms in the same direction, in one direction by positive actuation of said other of said mechanisms, and in the other direction by permitting actuation of said other of said mechanisms by a biasing means acting thereon.

23. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms in each direction automatically effects such movement of the other of said mechanisms in the same direction, in one direction by positive actuation of said other of said mechanisms, and in the other direction by permitting actuation of said other of said mechanisms by a biasing means acting thereon.

24. Projection apparatus comprising: a housing; movable light-beam-producing mechanism disposed within said housing movable to vary a characteristic of the utilized light beam produced thereby; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism in each direction automatically effects such movement of said light-beam-producing mechanism in the same direction, in one direction by positive actuation of said other of said mechanisms, and in the other direction by permitting actuation of said other of said mechanisms by a biasing means acting thereon.

25. Projection apparatus comprising: a housing; movable light-beam-producing mechanism disposed within said housing movable to vary the utilized light beam produced thereby between a beam suitable for cinematographic projection and a beam suitable for stereopticon projection; movable nose mechanism connected to said housing, provided with a first opening for the passage of light therethrough for cinematographic projection and with a second opening for the passage of light therethrough for stereopticon projection, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

26. Projection apparatus comprising: a housing; movable light-beam-producing mechanism disposed within said housing movable to vary the focus of the light beam produced thereby between a beam suitable for cinematographic projection and a beam suitable for stereopticon projection; movable nose mechanism connected to said housing, provided with a first opening for the passage of light therethrough for cinematographic projection and with a second opening for the passage of light therethrough for stereopticon projection, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

27. Projection apparatus comprising: a housing; movable light-beam-producing mechanism disposed within said housing, comprising light-producing means, comprising also movable reflector means cooperating with said light-producing means to produce a light beam, and variable by movement of said reflector means to vary the focus of said light beam between a beam suitable for cinematographic projection and a beam suitable for stereopticon projection; movable nose mechanism connected to said housing, provided with a first opening for the passage of light therethrough for cinematographic projection and with a second opening for the passage of light therethrough for stereopticon projection, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

28. Projection apparatus comprising: a housing; and light-beam-producing mechanism disposed within said housing and including light-producing means and reflector means cooperating with said light-producing means, said reflector means having at least a part thereof movable, and said light-beam-producing means being variable by movement of said part from condition to produce a light beam suitable for cinematographic projection to a condition to produce a light beam of different focus and suitable for stereopticon projection.

29. Projection apparatus comprising: a housing; and light-beam-producing mechanism disposed within said housing and including light-producing means and reflector means cooperating with said light-producing means, said light-producing means and at least a part of said reflector means being relatively movable, and said light-beam-producing means being variable by such relative movement from a condition to produce a light beam suitable for cinematographic projection to a condition to produce a light beam of different focus and suitable for stereopticon projection.

In testimony whereof I hereunto affix my signature.

C. M. FOX.